United States Patent
Marelja

(10) Patent No.: US 6,971,650 B2
(45) Date of Patent: Dec. 6, 2005

(54) GROUNDING LINE IN A VEHICLE

(75) Inventor: Walter Marelja, Niefern-Öschelbronn (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 10/787,256

(22) Filed: Feb. 27, 2004

(65) Prior Publication Data

US 2004/0232725 A1 Nov. 25, 2004

(30) Foreign Application Priority Data

Feb. 28, 2003 (DE) ................ 103 08 759

(51) Int. Cl.[7] .............................. B62D 33/00

(52) U.S. Cl. .................................. 276/181.1

(58) Field of Search ............... 296/181.1, 203.01, 296/204, 187.01, 193.07; 280/782; 180/311

(56) References Cited

U.S. PATENT DOCUMENTS

| 4,234,633 | A | * | 11/1980 | Gowetski et al. | 428/34.5 |
| 4,950,026 | A | * | 8/1990 | Emmons | 296/203.01 |
| 5,363,939 | A | * | 11/1994 | Catlin | 180/291 |
| 5,660,428 | A | * | 8/1997 | Catlin | 296/205 |
| 5,819,408 | A | * | 10/1998 | Catlin | 29/897.2 |
| 6,640,739 | B2 | * | 11/2003 | Woodall et al. | 114/312 |
| 6,838,839 | B2 | * | 1/2005 | Goto et al. | 318/139 |
| 2004/0070233 | A1 | * | 4/2004 | Steinhauser et al. | 296/193.01 |

FOREIGN PATENT DOCUMENTS

| DE | 2128318 | | 6/1971 | |
| DE | 2126032 | * | 12/1971 | B29D 0/00 |
| DE | 3903411 | * | 9/1990 | A63H 17/26 |
| FR | 2249544 | * | 6/1975 | B60K 1/04 |

* cited by examiner

*Primary Examiner*—H. Gutman
(74) *Attorney, Agent, or Firm*—Crowell & Moring LLP

(57) ABSTRACT

Component made of plastic for vehicles, whereby the component is the automobile monocoque of a vehicle and is preferably made of carbon fibers, with electric lines being laminated into the carbon fiber composite.

2 Claims, 1 Drawing Sheet

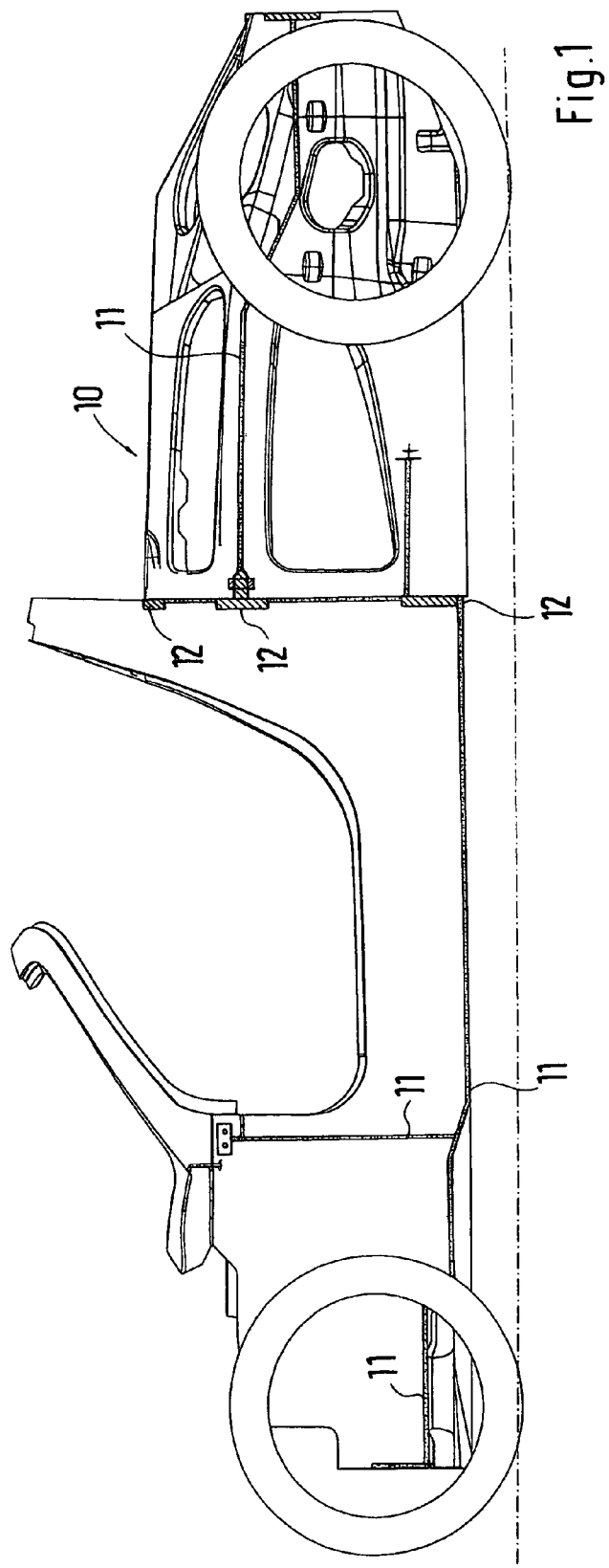
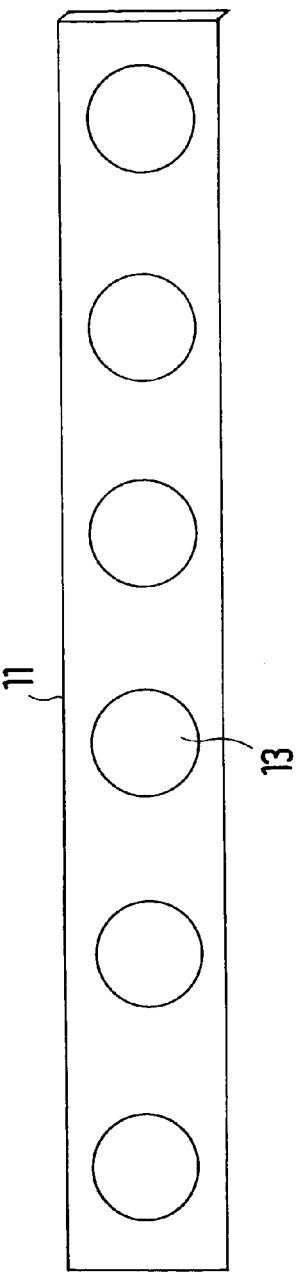

GROUNDING LINE IN A VEHICLE

This application claims the priority of German application no. 10308759.1, filed Feb. 28, 2003.

BACKGROUND AND SUMMARY OF THE INVENTION

The present invention relates to the implementation of a grounding line in a vehicle in which the base body is made of a nonconducting material.

It is known from German Patent DE 21 28 318 that to reduce weight, load-bearing and non-load-bearing chassis parts may consist of a plastic sandwich construction with a hard foam core, the cover layers of which consisting of plastic resin-impregnated woven fabrics, for example. It is also known from this that fastening elements such as pipes or bars and inserts for reinforcement may also be incorporated into the mold, so that they are securely anchored in the foam and in the cover layers in the finished component. It is known here that to implement line systems for the energy sources, a cohesive three-dimensional grating may be provided as an insert, which serves as a conductor for the flow of energy. For contacting the individual components, the lines passing through the foam core are brought to the cover layer and are contacted to other components through openings in the cover layer.

With the arrangement according to this invention, it is also possible to provide conductors for a grounding contact in the fiber structure itself even when using an automobile monocoque without a separate frame for a vehicle made of plastics such as glass fiber or carbon fiber and to laminate these conductors into the structure here. Thus by using the very rigid composite of carbon fibers and/or glass fibers, additional definite weight savings can be achieved and the monocoque without a separate frame may still be used for the grounding contact.

Providing individual contact points permits a good connection of the electric components to the grounding lines of the automobile body.

Other objects, advantages and novel features of the present invention will become apparent from the following detailed description of the invention when considered in conjunction with the accompanying drawings.

BRIEF DESCRIPTION OF THE DRAWINGS

FIG. 1 shows an automobile body made of plastic, and
FIG. 2 shows an example of a conductor laminated into the body.

DETAILED DESCRIPTION OF THE DRAWINGS

In FIG. 1 the monocoque 10 of a vehicle is shown in an elevation survey diagram. The monocoque is made of carbon fiber, which results in enormous weight savings. These high-quality and very lightweight materials which also have a very high strength are used mainly in race cars. For electric contacting and in particular for implementation of the grounding connection, conductors are laminated into the carbon fiber composite and are labeled with reference number 11 in FIG. 1. These conductors 11 may be made of aluminum or copper, whereby an electric conductor having the lowest possible weight is used.

The embodiment of such a conductor is depicted in FIG. 2, where it can be seen clearly that the conductor 11 has various passages 13, which permit a further reduction in weight. For contacting large areas or multiple components, aluminum plates 12 may also be laminated into the automobile body itself.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body, comprising:
   a monocoque body member formed from a plastic composite, said plastic composite including carbon fiber; and
   at least one electrical conductor,
   wherein the at least one electrical conductor is laminated into the carbon fiber-containing plastic composite, and
   wherein the at least one electrical conductor is an aluminum conductor having weight-reduction passages.

2. A method for constructing a vehicle body, comprising the step of:
   forming a monocoque body member from a plastic composite, said plastic composite including carbon fiber,
   wherein at least one electrical conductor is laminated into the carbon fiber-containing plastic composite, and
   wherein the at least one electrical conductor is an aluminum conductor having weight-reduction passages.

* * * * *